Aug. 4, 1942.   N. DOBROKHOTOFF   2,292,215
AUTOMOBILE TIRE CHAIN
Filed Sept. 23, 1940
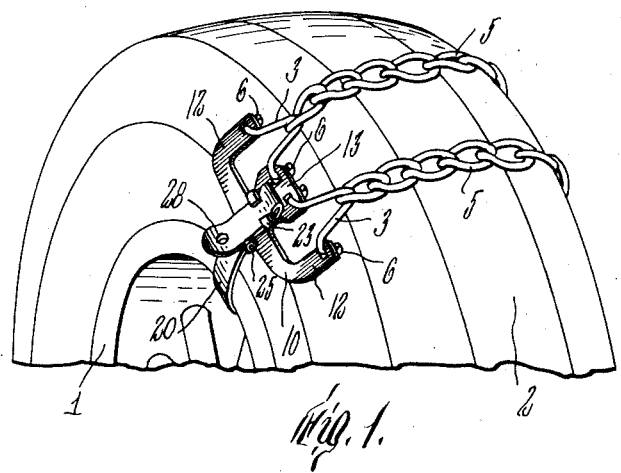
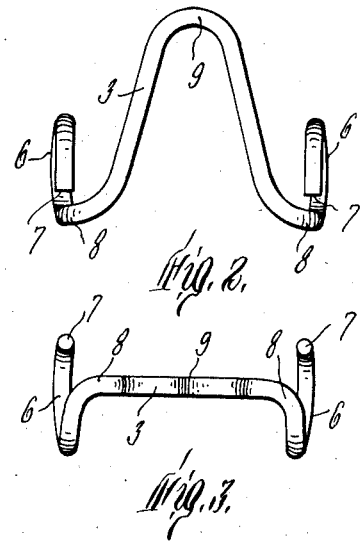
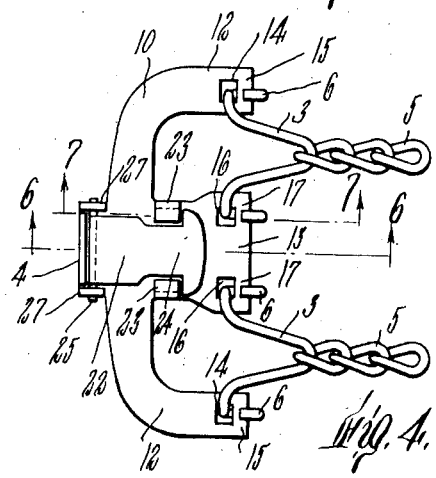
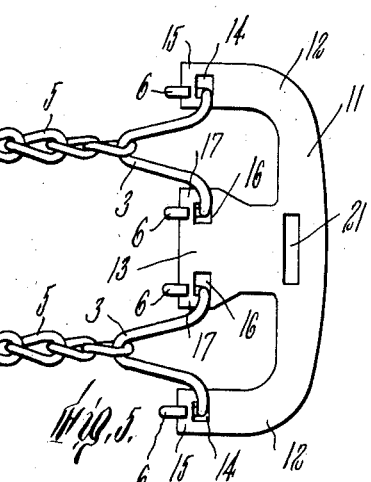
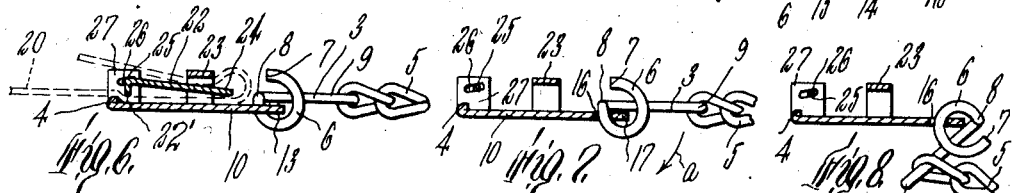
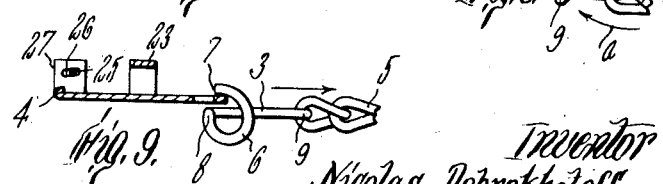
Inventor
Nicolas Dobrokhotoff
by Wright Brown Quinby & May
Attys.

Patented Aug. 4, 1942

2,292,215

UNITED STATES PATENT OFFICE 2,292,215

AUTOMOBILE TIRE CHAIN

Nicolas Dobrokhotoff, Suffolk County, Mass.

Application September 23, 1940, Serial No. 357,939

7 Claims. (Cl. 152—233)

This invention relates to automobile tire chains and has for an object to produce such a chain which can be assembled or disassembled quickly and without the use of tools.

A further object is to provide a construction whereby broken cross chains may be removed and replaced without the use of tools and in a simple and expeditious manner.

Still another object is to improve means for releasably attaching a strap to one of the end plates of the chain.

For a more complete understanding of this invention, reference may be made to the accompanying drawing in which Figure 1 is a fragmentary perspective view of a vehicle wheel showing a tire chain embodying the invention applied thereto.

Figures 2 and 3 are top plan and end elevations, respectively, of hook members by which the ends of the cross chains may be detachably secured to the side plates, which, in turn, are secured together as by a strap engaging the inner face of the wheel rim.

Figures 4 and 5 are plan views of the cross chains, hooks and plates assembled.

Figures 6 and 7 are sectional views taken on the lines 6—6 and 7—7, respectively, of Figure 4, Figure 6 showing in dotted lines the position of a strap for securing the side plates together.

Figures 8 and 9 are views similar to Figure 7, but showing successive positions in disengaging a cross chain hook from an end plate.

Referring to Figure 1, at 1 is indicated a vehicle wheel provided with a tire 2 thereon over which are passed the cross chains 5 which are shown as spaced apart about the periphery of the tire and which may be of any desired construction. These chains have their ends engaged in double hook members 3. Each of these double hook members is provided with partly open looped extremities 6, each being formed by coiling the wire of which the members are made partly on itself in substantially a common plane, with the free end 7 spaced somewhat from the portion 8. This portion 8 merges into an intermediate portion 9 which is shown of substantially V-shape and which is offset from the central axis of the loops 6. These hook members detachably engage side plates 10 and 11. As shown best in Figures 4 and 5 the side plates 10 and 11 are provided with double forked portions providing side and intermediate extremities 12 and 13. The side extremities 12 are perforated as at 14 to define between the perforation and the extreme end a pivot element 15. The intermediate extremity 13 is provided with a pair of spaced perforations 16 similar to the perforations 14 and defining outwardly thereof the pivot portions 17. These pivotal portions 15 and 17 receive the loops 6 of the double hook members 3 and in the operative position shown in Figures 1, 4, 5 and 6, the offset portions 9 of the double hook members extend in substantially parallel relation to or in alinement with the planes of the plates 10 and 11, the pivot portions 15 and 16 engaging adjacent to the portions 8 of the loops and the extremities 7 facing rearwardly with respect to these plates.

From an inspection of Figures 7, 8 and 9, it will be noted that these hook members may be detached from the side plates without the use of tools by merely rotating the loops 6 around the axes of the pivot elements 15 and 17 in such a direction that these pivot elements engage successively further from the portions 8 and nearer to the end portions 7. For example, starting from the position of Figure 7 and rotating one of the double hook members 3 in the direction of the arrow $a$ it is brought successively into the positions of Figures 8 and 9 during which action the offset portion 9 is rotated through an angle of substantially 180°, this portion 9 passing between the forked portions 12 and 13. In the position of Figure 9 a mere outward pull on the hook member is necessary to entirely detach the hook member from the plate. It will thus be seen that so long as the cross chains 5 are in taut condition across the tread surface of the tire the hook members are held attached to the end plates, but when removed from the tire it is only necessary to turn each of the hook members through substantially 360° to permit it to be detached from the corresponding end plate whereupon the cross chains can be removed therefrom and new cross chains substituted. The parts may then be re-assembled by reversing the process, the hook elements being presented to the end plates as shown in Figure 9 and then turned through 360° from the position shown in Figure 9 to that of Figure 7 in which condition the cross chains are firmly attached to the end plates.

The end plates and the cross chains may be held to the tread face of the tire by the use of tie means such as a strap 20 which is suitably secured to the side plates and passes around the inner face of the wheel rim. One end portion of the strap may be permanently secured to the end plate 11 in any well known manner as by being inserted through a slot 21 therein back of the intermediate extremity 13 and secured back on itself as by stitching as is well known.

The opposite end of the strap may be passed between the spokes of the wheel or through openings in the wheel web, depending on the type of wheel on which the chain is placed, and may be detachably clamped in engagement with the side plate 10. In order to provide such a detachable fastening the construction shown best in Figures 1, 4 and 6 may be employed. Referring to these figures it will be noted that back of the central extremity 13 the plate 10 is rearwardly extended and its edge bent upwardly to form a raised edge portion 4 over which the strap 20 may be passed. The end portion of the strap passes beneath an angle locking lever 22 which has a down turned short leg 22' which engages the strap substantially opposite to the raised edge portion 4 and holds the strap bent over this portion 4 as shown in Figure 6. The end portion of the strap is then folded backwardly over the forward leg 24 of the locking lever and between guide lugs 23 extending upwardly and inwardly turned toward each other in spaced relation to the top face of the plate 10. This locking lever 22 is provided at about the juncture between its legs 22' and 24 with opposite lateral extensions 25 which form a pintle engaging in a slot 26 in each of a pair of ears 27 extending upwardly from the plate 10. The slot 26 is inclined downwardly and rearwardly in such position that pressure exerted against the end of the leg 22 forces the locking lever rearwardly and downwardly to effect a tight clamping engagement of the strap between the lower end of its leg 22' and the raised edge portion 4. Tension exerted on the strap thus is effective to pull the parts more firmly into locking position. As shown in Figure 1 the end of a strap may be provided with means such as a perforation as 28 through which a wire or other suitable tool may be placed to facilitate the passing of the strap end between the wheel spokes or through an opening in the wheel web when the chain is being attached.

It should be understood from the foregoing description of one embodiment of the invention that various changes and modifications might be made without departing from the spirit or scope of this invention as defined by the appended claims.

I claim:

1. A tire chain comprising a pair of side plates, each having a forked portion provided with spaced pivotal elements, double hook members each provided with a pair of substantially coaxially spaced open loop ends for engagement one around one of said pivot elements and the other around the other of said pivot elements, cross chains connecting said hook members, said members having their intermediate portions offset from the axis of said loop ends for engagement with opposite ends of said cross chains in a direction such that turning of said members about their axes to pass said offset portions between the sides of the forked portions engaged by each hook from their normal positions is required to detach said hook members from said plates, and means for connecting said plates together inwardly of the tire.

2. A tire chain comprising a pair of side plates, each having a forked portion provided with spaced perforated ends, double hook members each provided with a pair of spaced substantially coaxial open loop ends for engagement one in one of said perforations and the other in the other of said perforations, cross chains connecting said hook members, said members having their intermediate portions offset from the axes of said loop ends for engagement with opposite ends of said cross chains in a direction such that turning of said hook members about their axes to pass said offset portions between the sides of the forked portions engaged by each hook from their normal positions is required to detach said hook members from said plates, and means for connecting said plates together inwardly of the tire.

3. A tire chain comprising a pair of side plates each having a double forked portion including side and intermediate extremities, each of said extremities having a pivot element and said intermediate extremities having a pair of spaced pivot elements, a pair of double hook members for each side plate each provided with a pair of partly open substantially coaxial loop ends for engagement at one end about one of said side extremity pivot elements and at the other end about one of said intermediate extremity pivot elements, and cross chains connecting said hook members, said members having their intermediate portions offset from said axes in an angular direction such that turning of said intermediate portions from their normal positions of use between said extremities is necessary to disengage said loops from said pivot elements, and strap means engaging said plates back of said intermediate extremities for holding said plates connected together inwardly of said tire and holding said cross chains in operative position.

4. A tire chain comprising a pair of side plates, each having a double forked portion including side and intermediate extremities, each of said side extremities having a perforation therethrough and each of said intermediate extremities having a pair of perforations therethrough, a pair of double hook members for each side plate each provided with a pair of partly open substantially coaxial loop ends for engagement at one end in one of said side extremity perforations and at the other end in one of said intermediate extremity perforations, and cross chains connecting said hook members, said hook members having their intermediate portions offset from said axis in an angular direction such that turning of their intermediate portions from their normal positions of use between said extremities is necessary to disengage said loops from said perforation, and strap means for engaging said plates back of said intermediate extremities for holding said plates connected together and holding said cross chains in operative positions.

5. A tire chains comprising side plates, cross chains connecting said side plates together over the tread surface of a tire, and a strap secured at one end to one of said plates, and adapted to be engaged inwardly of the tire with the other of said plates, said other plate having a raised edge for engagement with said strap, and an angle locking lever fulcrumed in inclined slots of said other plate adjacent to said raised edge with one of its legs in engagement with said strap on the side opposite to said raised edge, said other plate having means for retaining an end portion of said strap bent backwardly over the other leg of said lever for holding said lever in strap locking position.

6. A tire chain comprising a pair of side plates, each having a forked portion provided with spaced pivotal elements, double hook members each provided with a pair of substantially coaxially spaced open loop ends for engagement one around one of said pivot elements and the other around the other of said pivot elements, cross chains connecting said hook members, said members having their intermediate portions offset from the axis of said loop ends for engagement with opposite ends of said cross chains in a direction such that turning of said members about their axes through an angle at least substantially 180° from their normal positions is required to detach said hook members from said plates, and means for connecting said plates together inwardly of the tire.

7. A tire chain comprising a pair of side plates, each having a forked portion provided with spaced perforated ends, double hook members each provided with a pair of spaced substantially coaxial open loop ends for engagement one in one of said perforations and the other in the other of said perforations, cross chains connecting said hook members, said members having their intermediate portions offset from the axes of said loop ends for engagement with opposite ends of said cross chains in a direction such that turning of said hook members about their axes through angles of at least substantially 180° from their normal positions and between the sides of the forked portions of their respective side plates is required to detach said hook members from said plates, and means for connecting said plates together inwardly of the tire.

NICOLAS DOBROKHOTOFF.